United States Patent [19]

Nordal et al.

[11] Patent Number: 4,620,104
[45] Date of Patent: Oct. 28, 1986

[54] INFRARED RADIATION SOURCE ARRANGEMENT

[76] Inventors: Per-Erik Nordal, Tappen 38, 1300 Sandvika; Svein O. Kanstad, Conrad Holboes vei 67, 9000 Troms, both of Norway

[21] Appl. No.: 545,388
[22] PCT Filed: Feb. 16, 1983
[86] PCT No.: PCT/NO83/00006
§ 371 Date: Sep. 28, 1983
§ 102(e) Date: Sep. 28, 1983
[87] PCT Pub. No.: WO83/03001
PCT Pub. Date: Sep. 1, 1983

[30] Foreign Application Priority Data

Feb. 22, 1982 [NO] Norway .................................. 820544

[51] Int. Cl.⁴ .............................. G01J 3/10; H05B 3/26
[52] U.S. Cl. ............................ 250/493.1; 250/504 R; 250/495.1; 250/352
[58] Field of Search ............. 250/495.1, 504 R, 503.1, 250/339, 352, 493.1; 219/411, 553, 358, 354

[56] References Cited

U.S. PATENT DOCUMENTS

| | | | |
|---|---|---|---|
| 3,111,587 | 11/1963 | Rocard | 250/493.1 |
| 3,487,213 | 12/1969 | Horan et al. | 250/352 |
| 3,558,889 | 1/1971 | Chang | 250/493.1 |
| 3,694,624 | 9/1972 | Buchta | 219/358 |
| 3,875,413 | 4/1975 | Bridgham | 250/492 |
| 3,961,155 | 6/1976 | Weldon et al. | 219/216 |
| 3,968,370 | 7/1976 | Luft | 250/343 |

FOREIGN PATENT DOCUMENTS 1174515 12/1969 United Kingdom .
1141889 6/1976 United Kingdom .

Primary Examiner—Bruce C. Anderson
Assistant Examiner—Paul A. Guss
Attorney, Agent, or Firm—Ladas & Parry

[57] ABSTRACT

Infrared radiation source arrangement, in particular for use in infrared spectral analysis. To an electrically insulating substrate (2) there is applied one and preferably at least two separate electrically conductive films (2a, 2b) adapted to be heated by application of a time dependent electric current thereto. Tow or more films may form a radiation group (array) in which each film (2a, 2b) is adapted to be energized separately with electric current from an electric drive circuit (1) for applying a time dependent, preferably pulse shaped electric current to the film or films, so that infrared radiation pulses are emitted. The electric current is time controlled in order that the radiation pulses from the respective films may be distinguished from each other in a detector (6). The thickness of the substrate and the thermal conductivity, specific heat and density of the substrate material are so chosen that the thermal time constant is adapted to the pulse frequency range of the drive circuit.

26 Claims, 11 Drawing Figures

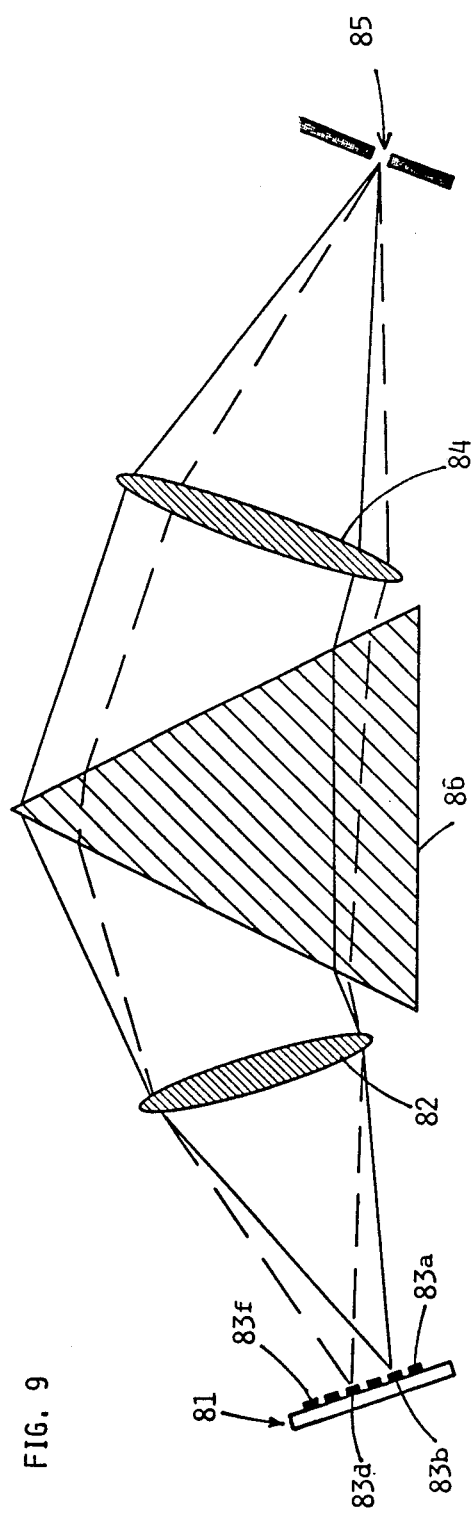
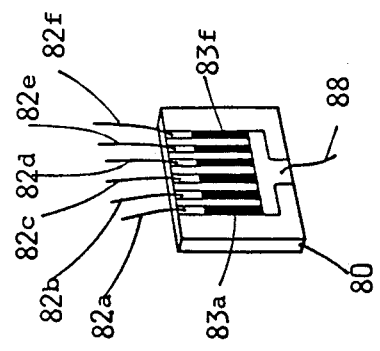
FIG. 8
FIG. 9

INFRARED RADIATION SOURCE ARRANGEMENT

This invention is concerned with infrared radiation sources, and is intended to bring forth improvements in various applications where such radiation sources are used, particularly as regards infrared spectral analysis.

All bodies and objects of non-zero absolute temperature emit thermal radiation. This is electromagnetic radiation, the spectral energy density $u(v)$ of which is given by Planck's law of radiation:

$$u(v) = \frac{8\pi h v^3}{c^3}\left(e^{\frac{hv}{kT}} - 1\right)^{-1}, \qquad (1)$$

which is strictly valid for a blackbody. Here, T is the absolute temperature of the body, k is Boltzmann's constant, $v$ is the radiation frequency, h is Planck's constant, and c is the speed of light. For bodies at room temperature ($T \approx 300K$), this yields a spectrum with a maximum intensity at approximately 10 micrometers ($\mu m$) wavelength in the middle infrared spectral range. If the temperature is increased, the spectral distribution will change according to (1), and the wavelength at maximum intensity ($\lambda_{max}$) will be displaced towards shorter wavelengths. For $T > 4000K$, $\lambda_{max}$ is close to or within the visible spectral range. This displacement is described to a good approximation by Wien's displacement law $$T \cdot \lambda_{max} \cong \text{constant} = 2897.9K \ \mu m, \qquad (2)$$

which can be derived from (1). By integration over all radiation frequencies, one finds Stefan-Boltzmann's law of total radiant excitance from a body:

$$W = \sigma T^4, \qquad (3)$$

where $\sigma = 5.67 \cdot 10^{-12} W K^{-4} cm^{-2}$ is Stefan-Boltzmann's constant. By integration over the emitting surface of the body, the total power radiated from the body is derived; it is seen to increase as the fourth power of the absolute temperature of the source. Total radiation from a body that is not ideally black is given, to a good approximation, through a simple modification of Stefan-Boltzmann's law:

$$W = \epsilon \sigma T^4, \qquad (4)$$

where $\epsilon < 1$ is termed the body's emissivity.

In principle, conventional infrared spectrometers consist of a hot radiation source, an optical filter that selects a restricted spectral region from the continuum-radiation emitted by the source, a chamber containing a sample which is trans-illuminated, and a detector that measures the radiation that has passed through the sample. Usually, the radiation sources operate at a *constant* temperature $T_h$, which is much higher than the background-(ambient)temperature $T_o$. In practical instruments, therefore, it is customary to insert a rotating wheel (a chopper) furnished with equidistant apertures along the rim, into the radiation path to make the radiation pulsed, since many types of infrared detectors only respond to changes in radiation level. This is specifically the case with pyroelectric detectors, and in applications of photoacoustic spectroscopy and related techniques. Pulsating radiation is also advantageous regarding electronic amplification and discrimination against noise.

Commonly used radiation sources, e.g. in general purpose laboratory spectrometers, are incandescent rods with coatings of relatively high and constant emissivity throughout a major portion of the near and medium infrared spectral region (gray-body radiation). Examples of the latter are the so-called Globar and Nernst-radiators. Radiation sources of the Globar and Nernst type are afflicted by the following shortcomings, which make them poorly suited in apparatus that must be robust, compact, cheap and possibly mobile:

large power consumption,
poor robustness against mechanical shock (silicon carbide rods, alternatively Yttria, Zirconia, etc.),
requires a chopper wheel or similar device in order to provide pulsating radiation,
relatively expensive when the cost of power supply is included.

However, such sources afford the significant advantage that, by chopped pulsing, they yield a train of radiation pulses with large on-off variations in radiation intensity, resulting in a correspondingly large signal S from the infrared detector. This is important in order to overcome the inherent detector noise and, thereby, to optimize the signal-to-noise ratio. Thus, the detector signal S will be proportional to the difference in radiant excitance between the hot body, $W_h$, and the cold chopper blade, $W_o$ (assuming that the optical system guiding radiation from the source to the detector has been designed to make the source cover the entire field of view of the detector): $S \propto W_h - W_o$. Provided the chopper is at ambient temperature $T_o$, substitution from (4) into this expression yields:

$$\underline{S_h} \propto \epsilon_h \sigma T_h^4 - \underline{\epsilon_o \sigma T_o^4} \text{ for } T_h > 3T_o \cong 900K, \qquad (5)$$

Here, $\epsilon_h$ and $\epsilon_o$ are the emissivities of the source and the chopper blade, respectively, and it is attempted to make $\epsilon_h$ large and $\epsilon_o$ small. From (5), one realizes that sources at $T_h > 900K$ (usually, $T_h = 1200-1500K$) yield a detector signal that in practice increases as the fourth power of the source temperature, since the radiation intensity from the chopper then will be $\leq$approx. 1% of that from the hot source.

From U.S. Pat. No. 4,084,096 and German Auslegeschrift No. 24 00 221 sources of infrared radiation are known that are based on electrically conducting filaments, intermittently heated by a pulsating current. The radiation source then continually irradiates the detector, all variations in radiation being due to the imposed changes in source temperature. Due to their long thermal time constants, such sources do not permit very rapid pulsations, since the difference between lowest and highest source temperature diminishes rapidly as the pulsing frequency is increased. Furthermore, those filaments sources suffer from limitations regarding mechanical stability and robustness, particularly as pertains to vibration. When metallic filaments are used, the infrared emissivity is generally low. Such filament-based adaptions, moreover, impose severe restrictions on geometrical design, as long as low production costs are required.

From U.S. Pat. No. 4,694,624 and German Auslegeschrift No. 24 42 892, infrared radiation sources are known, based on a disc-shaped, electrically insulating substrate onto which has been deposited an electrically conducting film, resistance-heated by an imposed electric current. The substrate may be a ceramic material, quartz or sapphire. Those radiation sources are exclusively referred to as radiators designed for constant temperature operation, which presupposes mechanical motion of apertures, filters etc. in order to create time dependent radiation levels at a detector, corresponding with the situation described for Globar and Nernst radiators. The physical construction of such radiation sources, consequently, is not oriented towards embodying a capability for rapid change of surface temperature, in response to a changing electrical current.

In its most general aspect, the present invention is predominantly a combination of features from previously known techniques as referred immediately above, with closer reference to substrate parameters for specific adjustment of the thermal time constant. Briefly, the invention thus concerns a pulsating infrared source in the form of a thin, electrically conducting stratum or film on an insulating substrate, and including an electric drive circuit for imposing a time dependent electric current through the film, the substrate thickness and its thermal conductivity, specific heat and density being chosen so as to achieve a thermal time constant compatible with the pulsing frequency for which the drive circuit is designed.

The solution described here brings within reach significant improvements over previously known radiation sources. First of all, there is the possibility of temperature pulsing by rapidly changing the application of electric current, which is of particular interest with sources based on a thin resistance film on a substrate, since such a conducting film may have a very short thermal time constant. Another very important possibility relating to the new infrared radiation sources described here, derives from the possibility of arranging the latter in groups of radiators (arrays), where the individual radiator or source may be separately adressed, and where combinations with optical filter masks entail new and special embodiments to be discussed below.

In one embodiment of the invention, where a sufficiently thin film of corresponding low heat capacity is chosen, as well as suitable thermal parameters in general, the film's surface temperature can be brought to oscillate in a rapid and controlled manner, concomitant with the current through the film. Thus it is possible to create heating and cooling transients with time constants of the order of 1 msec. The embodiment may for example be based on a thick film resistor on a ceramic disc substrate. The emitted infrared radiation may thereby be electrically controlled (pulsed) without the use of mechanically moving parts.

In a preferred embodiment of the infrared source according to the invention, a particularly high pulse rate is made possible, while at the same time maintaining a relatively large difference between highest and lowest surface temperature. For the purpose of explanation, one may here consider an electric pulse train where each current pulse lasts $\tau_1$ sec, while pulses are separated by intervals of length $\tau_2$ when no current flows. The goal is then to remove as much heat as possible from the film during the interval $\tau_2$, while the heat loss during the current pulse period $\tau_1$ should be as low as possible. This is achieved by making the substrate so thick that heat does not have time to diffuse through it during the time $\tau_1$. On the other hand, the substrate must be sufficiently thin such that the heat can diffuse through during the time $\tau_2$. That part of the substrate directly underneath the film is then nearly homogenously heated. By placing a good thermal conductor in physical contact with the rear surface of the substrate, and by cooling that conductor, heat from the film may thus be efficiently extracted between current pulses, while at the same time the film is thermally insulated from the heat conductor during the current pulses. To a good approximation, this can be described in terms of a thermal diffusion length which is typical of the substrate:

$$\beta = \left(\frac{k\tau}{\pi \rho C}\right)^{\frac{1}{2}} \qquad (6)$$

where k is the thermal conductivity, $\rho$ is the density and C is the specific heat of the substrate material, whereas $\tau$ is the time during which thermal diffusion takes place. In other words, the thickness L of the substrate should be chosen such that $$\beta_1 < L\, \beta_2 \qquad (7)$$

where $$\beta_1 = \left(\frac{k\tau_1}{\pi \rho C}\right)^{\frac{1}{2}} \qquad (8)$$

$$\beta_2 = \left(\frac{k\tau_2}{\pi \rho C}\right)^{\frac{1}{2}} \qquad (9)$$

Depending on how rapid thermal transients one wishes to create in the source, the substrate must be chosen such that (7) is satisfied, in relation to (8) and (9). The source temperature will then vary between $T_h$ (highest) and $T_l$ (lowest). At high pulse rates one has:

$$\Delta T = T_h - T_l << T_h \qquad (10)$$

In analogy with (5), the time dependent detector signal will be proportional to $$S_\Delta \propto \epsilon \sigma T_h^4 - \epsilon \sigma T_l^4 \cong 4\epsilon \sigma T_h^3 \cdot \Delta T \qquad (11)$$

When compared with the case of a mechanically chopped source, this represents a reduction in signal strength from the detector by a factor $$\frac{S_\Delta}{S_h} \cong \frac{4\epsilon \sigma T_h^3 \Delta T}{\epsilon \sigma T_h^4} = \frac{4\Delta T}{T_h} \qquad (12)$$

provided $T_h$ is the same in both cases. However, even for $\Delta T$ as small as 10–50K, this only implies a signal reduction by factors from 1/25 to 1/5 when $T_h = 1000K$. In many practical measurement tasks, such detector signals are still adequate; in this case the signal increases as the third (and not the fourth) power of the source temperature.

In many applications, the above-mentioned heat conductor contacting the substrate at the rear, will have higher thermal conductivity than the substrate material, and may consist of, e.g. a backing plate of metal. In other cases the rear side of the substrate may be in contact with a medium such as ambient air, a flowing liquid or a vacuum. The thermal time constant of the system should be optimized for the pulsing rate at which the radiation source is to operate. According to the invention, this optimization is performed through proper choice of substrate thickness and thermal conductivity, specific heat and density of the substrate material, depending on the medium or body that is in thermal contact with the substrate's rear.

For instance, a substrate time constant may be found from (6), by equating $\beta$ with L and solving with respect to $\tau$:

$$\tau_s = \frac{L^2 \pi \rho C}{k} \tag{13}$$

As remarked above, this corresponds roughly to the time required for the substrate to become heated all through its volume underneath the film. With sinusoidal electric currents of frequency f (Hz); an approximate match between the substrate's time constant and the drive circuit's pulse rate is then obtained from $$\tau_s \approx f^{-1} \tag{14}$$

Since one is dealing with diffusive processes, however, (14) must only be taken as an approximate relation, and corrections have to be made empirically, to accomodate the actual pulse shapes that are used (square wave, triangular etc.), the efficiency of the rear side cooling, etc. Indeed, if optimum temperature amplitudes $\Delta T$ are not required, or have to be sacrificed in order to gain other advantages (e.g., mechanical strength of the substrate), the substrate may be made several times thicker than required from (14). In such cases, however, the substrate is more easily fractured by thermal stress, since only the front undergoes thermal expansions and contractions, whereas the bulk experiences very little thermal cycling. As a general guide line as regards the optimization of the substrate's time constant, therefore, substrate materials with high thermal conductivity and low density and thermal capacity are favourable, as are thin substrates, whenever applicable. Another embodiment of the invention, alluded to above, is of particular interest. At least two separate films are arranged to constitute a radiator group (array), where each film is to be excited separately by an electric current which has been given a time dependence such that the ensuing radiation pulses from each film, respectively, can be specifically identified. This also applies to cases where radiation from two or more films is recorded by means of one and the same detector.

Among the advantages inherent in this invention, the following shall be mentioned in particular:

The time dependent intensity of the radiation emitted from the source can be rapidly altered by purely electronic means, permitting intensity modulation without any mechanically moving parts. It is straight forward to produce pulses of duration in the millisecond range. At the same time, high flexibility is retained regarding short- and long term stabilization of the source.

An analytic instrument may contain several film-elements to be activated in sequence, and radiation pulses can be identified by correlation with the time interval when each given film element was activated. For instance through well-established thick film techniques, it is possible to deposit such an infrared radiation source containing several films as a pattern or array (radiator group) on a single substrate, where each film is individually activated. By such arrangements it becomes possible to perform analysis at several infrared wavelengths.

A further advantage results from the possibility of very low power consumption, when pulsing in a mode with pulses of short duration spaced by longer intervals (i.e. low "duty cycle"). This has obvious implications for apparatus that is battery-powered, etc.

In addition to the above-mentioned advantages, it may more generally be mentioned that physical designs can be made simple and based on well-known technology. Thus, one may directly make use of know-how from the production and use of thick film resistance elements in microelectronic circuits. From the use of simple, proven principles of construction other advantages follow, such as reliability, stability, robustness, low price, and long life. Finally, it may be mentioned that the invention allows wide latitude with respect to specific designs, e.g. for integration into a sensor head, configurations including different forms of cavity radiators, etc.

Arrangements based on the invention can find use in many different types of sensors and apparatus that monitor, give warning of or analyze gases, liquids or solids, by making use of the infrared absorptive properties of the latter. Applications that appear closest to realization at present are gas sensors for point measurement monitoring of fire and explosion hazards on oil drilling platforms and ships, in situ measurements of harmful gases in working-place atmospheres, patient- and regional surveillance in hospitals, particularly in operating rooms and intensive care wards, investigations relating to respiration physiology, monitoring in industry, e.g. monitoring or controlling chemical processes and product quality, and ventilation system control.

Other applications are of interest in sensors for measurements on solids and liquids, e.g. photoacoustic instruments for measuring dust and particulates.

It is important to note that the invention signifies a new generation of infrared instruments that are particularly well suited for mass production. Such instruments represent a competitive alternative to, e.g., present-day commercial gas measurement instrumentation; compared to the latter they have small physical dimensions, low power consumption and low price.

In the following, the invention will be explained more closely, with reference to the drawings, wherein:

FIG. 8 shows schematically a particular application of a radiator group in the form of parallel film strips, in an arrangement with a dispersive element (here: a prism).

FIG. 9 shows in perspective and somewhat more detailed a radiator group that can be used in the arrangement in FIG. 8, and FIGS. 10a and 10b together illustrate thermal aspects of importance for embodiments according to the invention.

Figure 1:
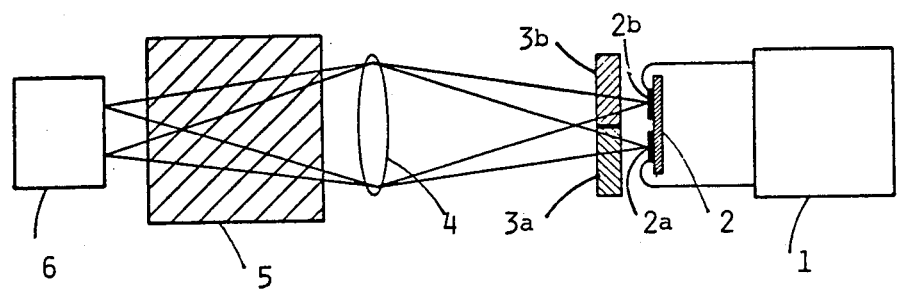
FIG. 1 shows schematically the lay-out of an instrument for infrared analysis of a sample.

In FIG. 1 there is shown an infrared radiation source consisting of a disc-shaped substrate 2 onto which have been deposited two separate films or film areas 2a and 2b, that are arranged to be excited by an electric circuit. An optical filter has been positioned in front of the radiation source; the filter consists of two sub-units 3a and 3b which are associated with films 2a and 2b, respectively. A lens 4 directs the infrared radiation towards a sample 5 that is to be analyzed. Following transmission through the sample 5, the infrared radiation strikes a detector 6.

The exciting circuit 1 serves to drive a time dependent, preferably pulse shaped, electric current through the films 2a, 2b, so that they alternately emit pulsed infrared radiation. The two films or film areas 2a and 2b may be driven or excited separately, and with such time dependence that radiation from each film can be individually identified, through similar time control of the detector or its subsequent signal processing circuits. If from each film 2a and 2b at the radiation source, radiation is guided through separate optical bandpass filters, e.g. the filters 3a and 3b, it becomes possible to realize spectral reference- and/or discrimination functions. The two films that constitute the infrared radiation source in FIG. 1, are arranged to form a radiator group (array), which is excited in a coordinated time sequence such that the radiation pulses from the different films can be individually identified. This also includes the case where radiation from two or more films is to be detected by one and the same detector.

As regards construction of the source element, i.e. substrate 2 with films 2a and 2b, including electrical leads from the exciter circuit 1, such elements can be produced fairly simply, to withstand surface temperatures of the films of 500°–700° C. for long periods of time without damage. The infrared radiation properties of the films may be optimized to a certain extent by controlling the surface roughness, -shape, and -material. For purposes of stabilization and control, a temperature sensor may be positioned, e.g., at the rear side of the substrate, as is known from U.S. Pat. No. 3,694,624.

Clearly, the illustration of the radiation source in FIG. 1 is quite schematic and simplified; thus the film thickness, e.g., is strongly exaggerated in the figure.

Figure 2:
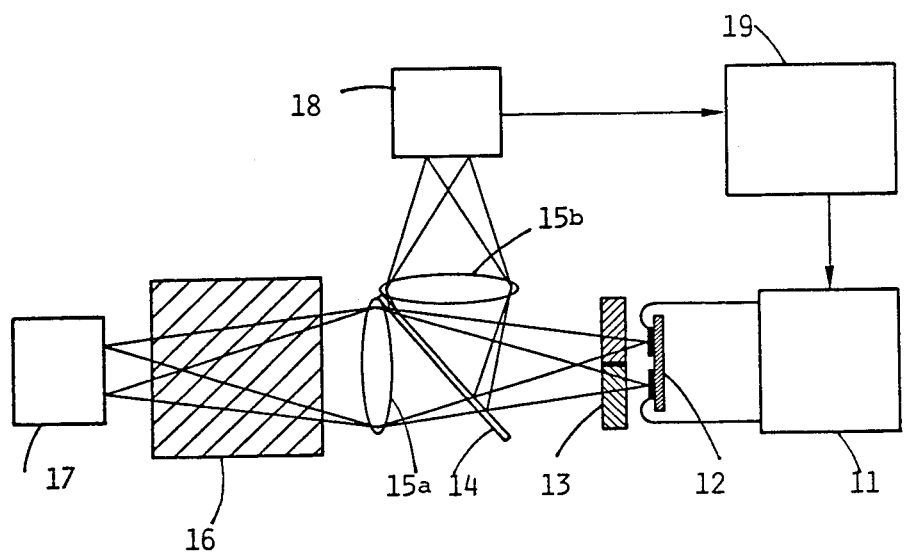
FIG. 2 shows schematically an instrument as in FIG. 1, but with a feedback circuit incorporated into the control and drive circuit of the radiation source.

In analogy with the arrangement in FIG. 1, FIG. 2 shows an electric drive circuit 11, a source substrate 12 with two films, an optical filter 13 with two sub-units, a sample 16 and a detector 17. The optical system comprises a partially reflecting plate ("beam-splitter") 14 and two lenses 15a and 15b, among which the first collects radiation onto the sample 16, while the second lens 15b focuses part of the radiation onto a reference detector 18. The latter is connected to a control unit 19 which also may contain logical circuits. By connecting the control unit 19 and the electrical excitation circuit 11, a complete closed loop feedback and drive circuit is formed which enables the radiation intensity from each film in the source, as measured at the reference detector 18, to be controlled individually and to follow a predetermined temporal profile, if so desired.

The arrangement in FIG. 2, which is based on the radiation source/filter combination emitting at two separate wavelengths, possesses certain advantages compared to systems based on a single wavelength (analytic wavelength $\lambda_1$); the latter is vulnerable to accumulation of dirt on the optical components, as well as to changes in the radiative properties of the source. If good long term stability is desired, such a dual channel system may be employed, in which radiation at a reference wavelength $\lambda_2$ (where the sample absorbs weakly) is also transmitted through the optical system. A well designed arrangement of this type, e.g., in a gas monitoring instrument, will cause any changes in source, optics or detector to yield nearly the same relative signal change at $\lambda_1$ and $\lambda_2$. Drift caused by dirt build-up on optics or changes in detector responsivity thus may be compensated for by dividing the signal at wavelength $\lambda_1$ by that at wavelength $\lambda_2$. A reference detector such as 18, which measures the radiation intensities at wavelengths and $\lambda_1$ and $\lambda_2$ before the radiation passes through the sample 16 (e.g., a volume of gas), also permits corrections to be made, compensating for changes in the source.

Furthermore, such reference measurements before the radiation passes through the sample make it possible to control the source intensities at each wavelength separately. One relevant possibility which is simple to implement technically, is to make the intensity or, alternatively, the energy of the radiation pulses at $\lambda_1$ and $\lambda_2$ equal, as measured at the reference detector, regardless of differences in optical filter transmission, etc. Since these reference measurements only need to be qualitative, demands on linearity in the detector 18 become very modest. Also, signal strengths at the wavelengths $\lambda_1$ and $\lambda_2$, measured at the detector which records the radiation intensity after passage through the sample (e.g. a gas volume), then need not be corrected for source variations, and the subsequent signal processing is thereby simplified.

Figure 3:
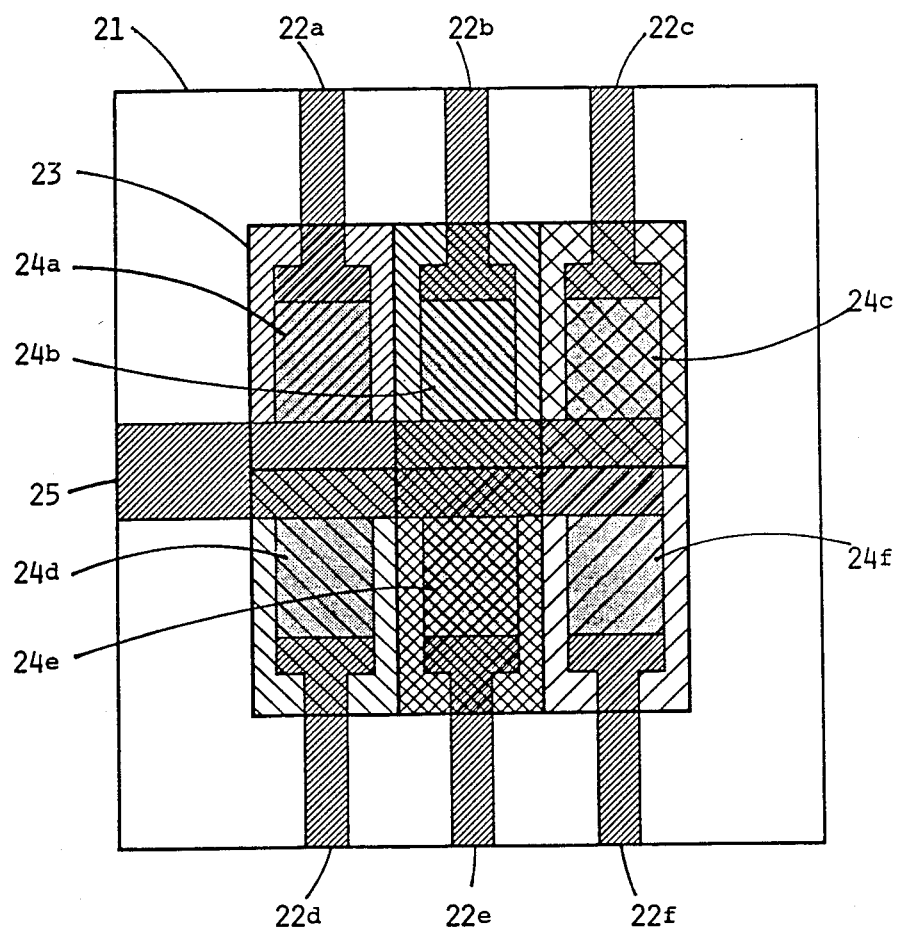
FIG. 3 shows a front view of a radiator group (array) containing six individually addressable films that, together, constitute the infrared radiation source.

If it is desired to measure several sample components (e.g. gases) that are present at the same time, the above arrangement can be extended to comprise several films located close together to form a common source, or radiator group, behind a common filter or segmented filter mask, that makes each individual film the origin of radiation at one analytic wavelength only. An example of such a radiator group with six individually addressable films is shown in FIG. 3. The arrangement, viewed from the front side, comprises a substrate 21 of electrically insulating material, onto which have been deposited six separate films or film areas 24a–24f. A special electrical conductor 22a–22f makes it possible to excite each of the film areas 24a–24f separately with current pulses. A common conductor 25 for return current from all six films is also shown. As is well known, the conductors may consist of thin metallic films deposited onto the substrate. In front of the films an optical filter 23 has been positioned, which may be located in the immediate vicinity of the films. The filter 23 is shown schematically, segmented to correspond with the pattern of films 24a–24f. Each filter segment may be a bandpass filter made for specific wavelengths or wavelength intervals making the combined radiator group and filter unit into a source of infrared radiation at six wavelengths according to choice.

The separate films may be excited sequentially at the same pulse rate or -frequency, or they may be excited at separate pulse rates or frequencies.

In instruments or apparatus containing a radiator group of this kind, one and the same infrared detector can be used for recording the intensities at all wavelengths. Each wavelength channel is then identified from the time interval when its associated film was activated, and it is presupposed that activation takes place according to a definite sequence or programme. Electrical circuits suitable for such excitation can easily be designed by an electronics specialist.

Figure 4:
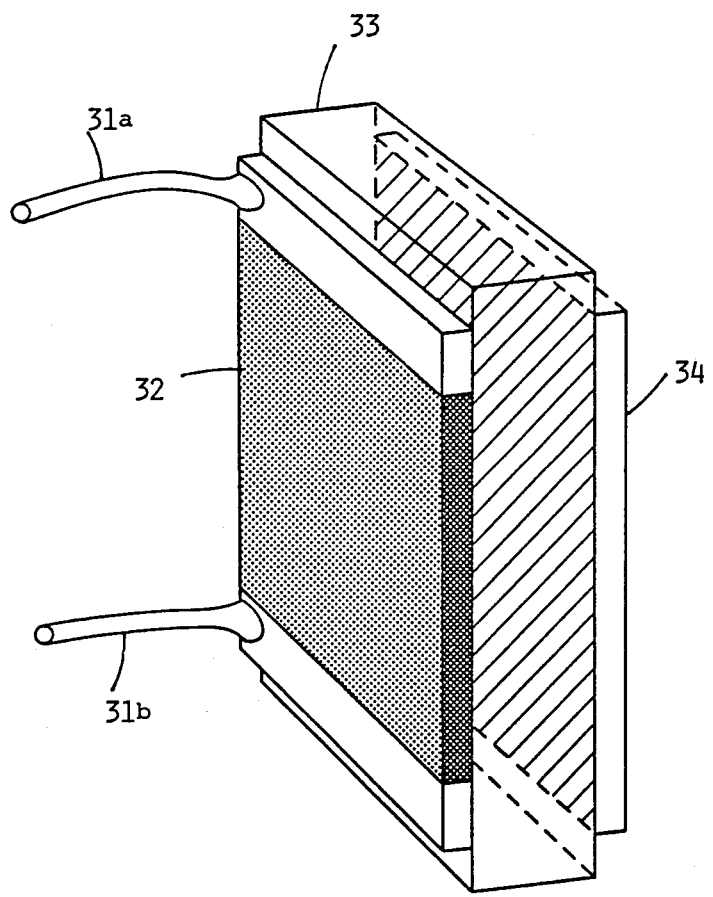
FIG. 4 shows in perspective a particular embodiment of an infrared radiation source based on the arrangement according to the invention.

FIG. 4 shows, simplified and in perspective, an example of an infrared radiation source which, according to a particular embodiment of the invention, is based on an optically transparent substrate 33 that carries an infrared-emitting film 32 on one side and an infrared optical filter 34 on the other side. The film 32 has contacts with electrical leads 31a and 31b along two opposing edges. For clarity, certain dimensions in the drawing (particularly thicknesses) have been exaggerated. In many cases, the simple design may be advantageous, but it should be borne in mind that the filter coating 34 must be able to withstand the heating experienced by the substrate 33. As previously mentioned, this heating depends on the temporal variations of the current pulses exciting the source, and can be made comparatively small through pulsing at low duty cycle, in combination with a sufficiently thick substrate.

Figure 5:
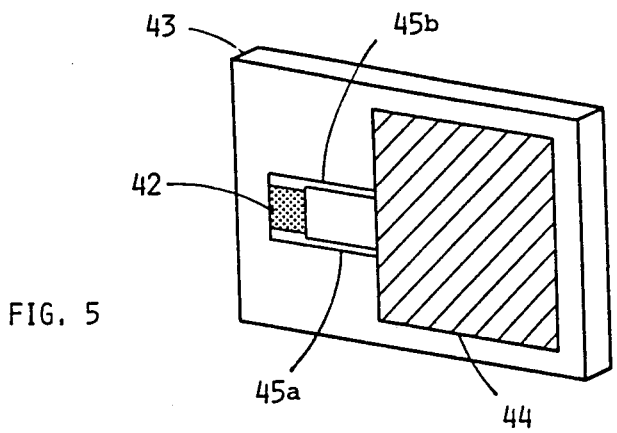
FIG. 5 is a simplified presentation of another particular embodiment based on the invention.

FIG. 5 indicates in principle how a substrate 43 may carry an infrared-emitting film 42 as a radiation source, while at the same time containing an electrical excitation circuit 44, possibly also encompassing associated electronics, e.g., control curcuits etc. as discussed previously. In the figure are shown leads 45a and 45b from the excitation circuit 44 to the film 42. In this design, too, one must bear in mind possible limitations related to the substrate's temperature during operation. An integrated solution of this kind represents obvious advantages in production, especially as regards modern fabrication techniques for microelectronics.

In the various embodiments mentioned previously, the film itself, or a coating on the latter, may consist of a material that has been specifically chosen to achieve a particular, desired spectral emission characteristic, i.e., with high emissivity in spectral regions of particular interest, or with particularly low emissivity in regions where spectral interference is to be eliminated. It is common knowledge that different substances or materials may possess emission characteristics that deviate more or less from the characteristics of a blackbody. An embodiment based on the principles discussed here will include a composite film, comprising an electrically conducting sub-layer of low emissivity, e.g. a highly reflecting metallic film, onto which has been deposited a material that, upon heating, emits radiation with pronounced and characteristic spectral structure.

Such a selective radiator or film, with high emissivity at wavelengths $\lambda$ approximately equal to 10,4 micrometers, may consist of an aluminium film with a barrier oxide film of $Al_2O_3$. The oxide may be deposited through high temperature exposure to an oxygen-containing atmosphere, or through anodization in an electrolyte.

Another example is a selective radiator, with particularly high emission at wavelengths $\lambda$ approximately equal to 3.4 micrometers, made from a metal film (e.g. gold, silver or aluminium) coated with a thin film of a substance containing C—H bonds, such as a polymer with a high melting point. Still other embodiments may be based on, e.g., mineral films containing Si-O bonds, etc.

Figure 6:
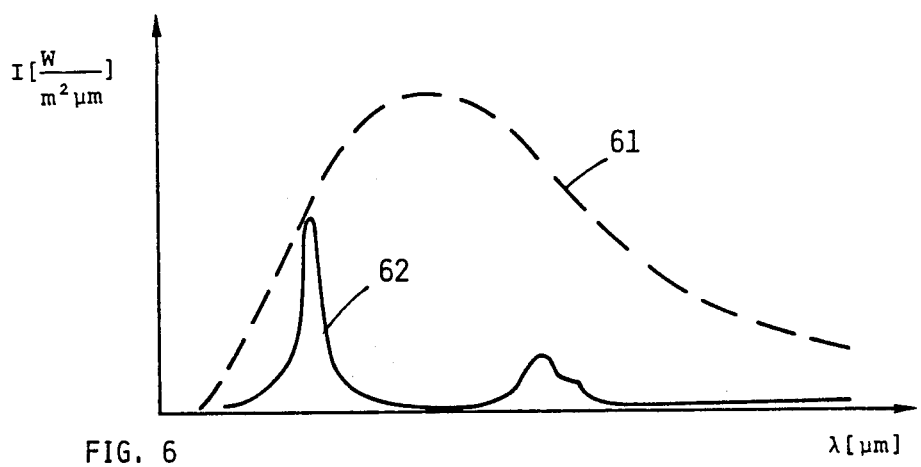
FIG. 6 shows two spectral emission characteristics.

FIG. 6 illustrates the concept of a selective radiator as discussed above: The characteristic 61 in the diagram represents radiation from a blackbody, whereas the curve 62 is representative of spectrally selective emission from a film containing a particular material as mentioned above. As is normal, the abscissa in FIG. 6 denotes the wavelength $\lambda$ in micrometers, while the ordinate denotes intensity in $Watts/m^2\mu m$.

Without specific reference to any particular film composition, it should be pointed out in connection with the above that films may be deposited or shaped into a wide variety of geometries and surface structures, to realize special emissive properties. Thus, it is well known that conical or wedge-shaped cavities, or grooves of different shapes, can yield high emissivity.

Figure 7:
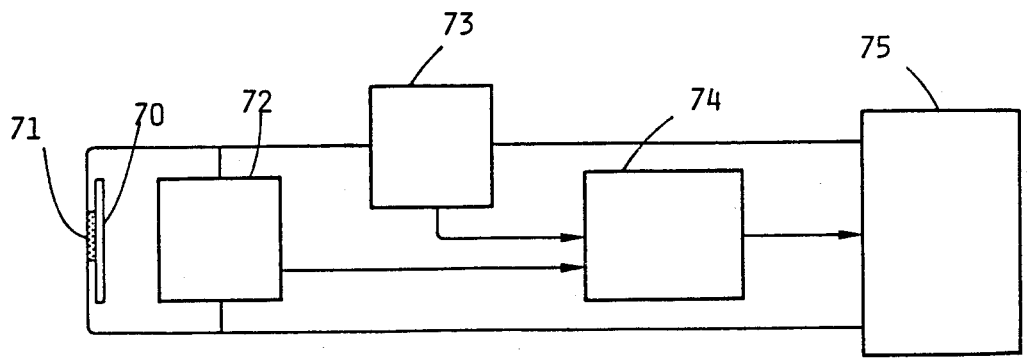
FIG. 7 shows a simplified principle scheme for temperature control of an infrared radiation source.

FIG. 7 shows a particular embodiment according to the invention, where temperature control is achieved by means of a temperature-sensing element connected with the emitting film. As mentioned above, such a temperature-sensing element has previously been used; it was then deposited onto the rear of the substrate, e.g., as a thick film thermistor. As is apparent from FIG. 7, the film element itself is here employed as the temperature-sensing element. The film must then be made from a material whose electrical resistivity is sufficiently temperature dependent. In FIG. 7 a radiation source is shown, with a substrate 70 onto which has been deposited a film 71, consisting of a material whose resistivity is so strongly temperature dependent that the film itself constitutes the temperature sensing element. In order to exploit the resulting temperature dependent signals (e.g., voltage) from the film 71, a circuit 72 has been arranged for measuring the voltage drop across the film, with another circuit 73 for measuring the current that flows through the film 71. A logic circuit 74 computes the electrical resistance of the film, compares it with a preset reference, e.g., a time dependent reference voltage, and generates from this a control signal. The latter is fed to an electrical drive circuit 75, which generally functions in analogy with the excitation circuits previously described. Within limits set by thermal time constants, this design and its associated circuitry permits control of the temperature versus time relationship in each radiation pulse, stabilization of mean temperature or, alternatively, control of a fixed temperature becomes trivial.

Linear radiator groups in the form of, e.g., a series of narrow, parallel film stripes are of particular relevance in spectroscopic applications. By means of a dispersive element (prism, grating, etc.), radiation of different wavelengths originating from the separate single film elements within such radiator groups, may then easily be combined. In this manner it becomes possible to create infrared radiation sources that emit multi-spectral radiation, in which the intensity and time dependence at each wavelength is controlled purely electronically via the addressable film elements. Furthermore, radiation at all wavelengths can be directed through a small common area (a slit), thereby readily being given a common direction of propagation, e.g., for transmission over long distances. At the same time it is straight forward to collect the radiation again onto another common area, such as a detector.

FIG. 8 schematically illustrates such an arrangement, based on a radiation source 81 which is also shown in perspective in FIG. 9. This source or radiator group consists of several parallel film stripes which are oriented normal to the plane of the paper in FIG. 8. Further in FIG. 8 are a lens 82 and a dispersive element which, for the clarity of presentation, is shown as a prism 86. Thereafter follows another lens 84 which focuses the rays from the prism 86 onto a narrow slit 85. The prism 86 causes rays from the different film stripes in the source 81 to overlap and propagate in the same direction, because radiation at different wavelengths is deflected at unequal angles by the prism 86. While radiation emanating from each stripe covers a broad spectral band, only a small part of this radiation, corresponding to a narrow spectral interval (different for each stripe), can pass through the slit 85 after transmission through the optical elements 82, 86 and 84. The spectral interval thus selected from each stripe is determined by the dispersion in the element (prism) 86, as well as by the general optical configuration (angular spread between stripes, etc.). The rays traced in FIG. 8 concern two different film stripes denoted 83b and 83d, respectively, with their corresponding wavelength intervals. As previously discussed, with each film stripe may be associated an additional optical band pass filter, chosen to correspond with that particular wavelength interval from each stripe which can reach the slit 85, in which case the prism 86 serves only to combine radiation from the different film stripes. However, the wavelength selection may also be performed exclusively by means of the dispersive element (prism) 86 itself, with all the film stripes in the source 81 emitting over broader portions of the infrared spectral region.

In the space between the prism 86 and the lens 84, the mentioned spectrally selected rays are parallel as shown. Thus the lens 84 allows only those rays, and additional and similarly spectrally selected rays parallel with the former, to be collected at a common point, viz. the slit 85, which is positioned at the focal point of the lens 84. By proper excitation of the different film stripes in the source 81, it is thus possible to choose the spectral composition of that infrared radiation which is transmitted through the slit 85, each spectral component being also controllable in time. In addition, it becomes easy to collimate radiation from the slit for passage through a sample volume and refocusing onto a detector.

The particular embodiment of an infrared radiation source according to the invention, intended for the arrangement in FIG. 8 and similar ones, is illustrated in more detail in FIG. 9. Six parallel film stripes have been deposited onto a substrate 80. The outermost stripe on the left hand side has been labelled 83a in the figure, and the electrical leads for the separate film stripes have been labelled 82a–82f. At the opposite end, the film stripes are connected to a common electrical return lead 88. In this embodiment, the parallel film stripes can be excited independently by electrical current pulses derived from suitable electrical excitation or drive circuits.

Figure 10A:
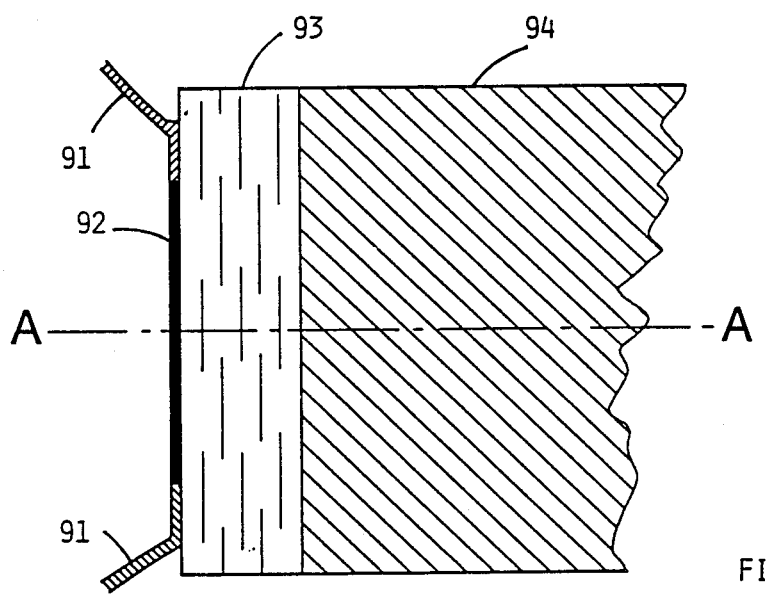
Figure 10B:
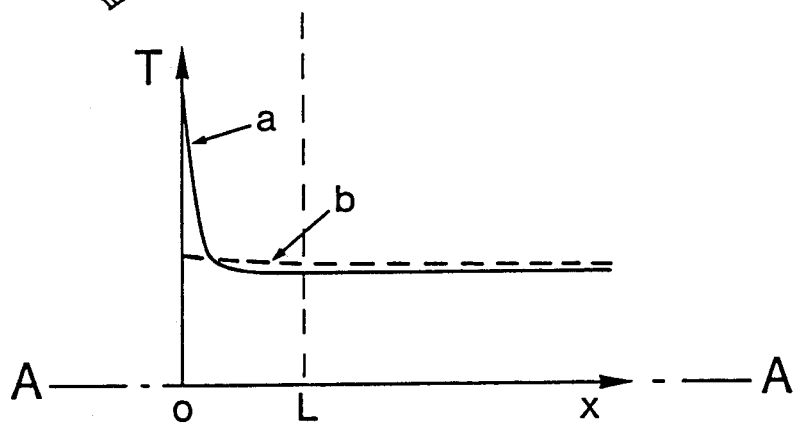

FIGS. 10a and 10b illustrate some thermal aspects as mentioned previously, particularly on pages 5 and 6. FIG. 10a shows a cross section through a radiation source encompassing a film 92, electrical leads 91, an electrically insulating substrate 93 and a slab or rear plate 94 which is in good thermao contact with the substrate and consists of material with high thermal conductivity. FIG. 10b shows temperature profiles a and b across a median section A—A through the source in FIG. 10a.

Curve a illustrates the situation at a time shortly after the film 92 has been excited by an electrical current pulse, while curve b shows the temperature profile at a later time, i.e., when the heat pulse has reached the rear plate 94, which acts as a heat sink. Through proper choice of the substrate's thickness, and the thermal conductivity, specific heat and density of the substrate material, the thermal time constant may be adjusted for optimum temperature contrasts at the particular pulsing rate or frequency at which the radiation source is to operate. In this connection, one must take into consideration whether the rear side of the substrate is in contact with a medium or body that may be thermally insulating or conducting to a larger or lesser degree, and which may transport heat away from the source. A slab or rear plate 94 as shown in FIG. 10a may remove heat from the substrate 93, as mentioned previously, and the rear plate itself may be connected to an active or passive cooling element or -system, an example being ordinary cooling fins with forced air cooling.

Finally, it should be remarked in connection with the FIGS. 10a and 10b that the dimension L indicated therein, corresponds, of course, to the thickness L which enters the expression (7).

The specific features of the arrangement according to the invention in its various embodiments and applications make possible modifications extending beyond those exemplified in the figures of the drawings. Thus, clearly, the number of films or film segments in the infrared radiation source can be chosen at will, and must not necessarily be only one, two or six as referred to and illustrated here. Where several film segments are excited concurrently, they need not be positioned on one and the same substrate. Thus, the principle of operation of, e.g., the arrangements in FIGS. 1 and 2 would still be as previously described, even if the two films referred to in each of these figures were located each on its own separate substrate. At this point, it should be emphasized that pulsed excitation of the radiation source is particularly advantageous in connection with radiator groups where two or more film segments are to excited in a coordinated manner.

We claim:

1. An improvement infrared radiation source arrangement for use in producing at least one pulsating beam of infrared radiation having
   an electrically insulating substrate, at least one resistive element comprising an electrically conducting film carried on one surface of said substrate, and electrical circuit means for energising and controlling the emission of infrared radiation from said at least one resistive element; in which the improvement comprises that said electrical circuit means is arranged to energise said at least one resistive element with pulsating current whereby pulsating thermal infrared radiation is emitted, and that the thickness (L) of the substrate, and the thermal conductivity (k), specific heat capacity (C) and density ($\rho$) of the substrate material are so chosen that the time constant $\tau_s$ of the substrate, where $$\tau_s = \frac{L^2 \pi \rho C}{k},$$

approximately satisfies the relationship $\tau_s$ being less than or approximately equal to $f^{-1}$ where f is the highest pulsation frequency contained in the energising current as provided by the electrical circuit means.

2. An improved infrared radiation source arrangement for use in producing at least one pulsed beam of infrared radiation, having an electrical insulating substrate, at least one resistive element comprising an electrically conducting film carried on one surface of said substrate, and electrical circuit means for energising and controlling the emission of infrared radiation from said at least one resistive element; in which the improvement comprises that said electrical circuit means is arranged to energise said at least one resistive element with pulses whereby pulses of thermal infrared radiation are emitted, and that the thickness (L) of the substrate is so chosen in relation to the thermal conductivity (k), specific heat capacity (C) and density ($\rho$) of the substrate material, that the following relationship is satisfied:

$$\left(\frac{k\tau_1}{\pi\rho C}\right)^{\frac{1}{2}} < L < \left(\frac{k\tau_2}{\pi\rho C}\right)^{\frac{1}{2}}$$

where
$\tau_1$ is the pulse length of the pulses provided by said electrical circuit means, and $\tau_2$ is the spacing between said pulses.

3. An arrangement according to claim 1 in which a back plate of good heat conducting properties is provided on the opposite surface of the substrate and in good thermal contact therewith.

4. An arrangement according to claim 1 in which each film is made to have a particularly high or, respectively, particularly low emission of infrared radiation in specially selected spectral intervals, the film being composed of an electrically conducting sub-layer of low emissivity, onto which there has been deposited a material that, upon heating, emits infrared radiation with a pronounced and characteristic spectral structure.

5. An arrangement according to claim 1 in which the substrate is adapted to serve also as the circuit board for the electrical circuit means.

6. An arrangement according to claim 1 in which a said film is made from a material whose resistivity is strongly temperature dependent and the film itself functions as a temperature sensing element.

7. An arrangement according to claim 1 in which the electrical circuit means comprises a reference detector to measure radiation from the films, the reference detector being incorporated into the circuit to influence the energising circuit so that the radiation intensity from each film, as measured at the reference dectector, can be individually controlled.

8. An arrangement according to claim 1 in which at least two films are so arranged as to form an array of radiators, each film being adapted to be separately driven by an electric current that is controlled in time in such a way that the radiation pulsations from the separate films can be distinguished from one another.

9. An arrangement according to claim 8, in which said at least two films are respectively driven at different pulse rates or frequencies.

10. An arrangement according to claim 8, in which said at least two films are all driven at the same pulse rate or frequency, but mutually displaced in time or phase.

11. An arrangement according to claim 8, in which said at least two films are situated on one and the same substrate.

12. An arrangement according to claim 8, including a dispersive optical element for causing beams of radiation from different films within an array of radiators to be fully or partially superimposed, and to be directed into a common direction.

13. An arrangement according to claim 8, in which each film is provided wiht an optical filter, the transmission characteristics of the optical filters being mutually different, whereby the films with their associated filters are adapted to provide infrared radiation each chiefly within its own spectral range.

14. An arrangement according to claim 13, in which the films and the optical filters are placed on opposite sides of an optically transparent substrate.

15. An arrangement according to claim 2 in which a back plate of good heat conducting properties is provided on the opposite surface of the substrate and in good thermal contact therewith.

16. An arrangement according to claim 2 in which each film is made to have a particularly high or, respectively, particularly low emission of infrared radiation in specially selected spectral intervals, the film being composed of an electrically conducting sub-layer of low emissivity, onto which there has been deposited a material that, upon heating, emits infrared radiation with a pronounced and characteristic spectral structure.

17. An arrangement according to claim 2 in which the substrate is adatped to serve also as the circuit board for the electrical circuit means.

18. An arrangement according to claim 2 in which a said film is made from a material whose resistivity is strongly temperature dependent and the film itself functions as a temperature sensing element.

19. An arrangement according to claim 2 in which the electrical circuit means comprises a reference detector to measure radiation from the films, the reference detector being incorporated into the circuit to influence the energising circuit so that the radiation intensity from each film, as measured at the reference detector, can be individually controlled.

20. An arrangement according to claim 2 in which at least two films are so arranged as to form an array of radiators, each film being adapted to be separately driven by an electric current that is controlled in time in such a way that the radiation pulsation from the separate films can be distinguished from one another.

21. An arrangement according to claim 20, in which said at least two films are respectively driven at different pulse rates or frequencies.

22. An arrangement according to claim 20, in which said at least two films are all driven at the same pulse rate or frequency, but mutually displaced in time or phase.

23. An arrangement according to claim 20, in which said at least two films are situated on one and the same substrate.

24. An arrangement according to claim 20, including a dispersive optical element for causing beams of radiation from differenct films within an array of radiators to be fully or partially superimposed, and to be directed into a common direction.

25. An arrangement according to claim 20, in which each film is provided with an optical filter, the transmission characteristics of the optical filters being mutually different, whereby the films with their associated filters are adapted to provide infrared radiation each chiefly within its own spectral range.

26. An arrangement according to claim 25, in which the films and the optical filters are placed on opposite sides of an optically transparent substrate.

* * * * *